May 26, 1936. J. M. SEYMOUR 2,041,969
TEMPERATURE MODIFIER FOR PROTECTING GROWING CROPS
Filed Feb. 10, 1936 3 Sheets-Sheet 1

INVENTOR.
James M. Seymour,
BY George D. Richards
ATTORNEY.

Patented May 26, 1936

2,041,969

UNITED STATES PATENT OFFICE 2,041,969

TEMPERATURE MODIFIER FOR PROTECTING GROWING CROPS

James M. Seymour, Newark, N. J.

Application February 10, 1936, Serial No. 63,093

10 Claims. (Cl. 47—2)

This invention relates to means for modifying low temperatures over fields of growing crops to prevent injury to the latter by frost.

This invention has for its principal object to provide a novel means for raising the temperature and dew point of cold air by warming the same and decreasing its relative humidity while dispersing the thus modified air over outdoor grown crops, to the end that risk of precipitation of dew upon the growing plants with accompanying formation of damaging frost is prevented; such means comprising essentially, a power driven means for moving a large volume of air in a flowing current in combination with means for producing a high temperature flame adjacent to the point of genesis of the air current, whereby the heat of said flame is quickly transferred to the moving air masses with temperature raising and humidity decreasing effect thereupon, and the resultant warmed air is spread or dispersed outwardly over a considerable area of growing crops desired to be protected thereby.

The invention has for a further object to provide a novel mobile apparatus for the stated purposes which may be moved around a field of growing crops and so controlled as to direct at will and disperse over the latter temperature modifying streams of warmed air.

Other objects of this invention, not at this time more particularly enumerated, will be understood from the following detailed description of the same.

Figure 1:
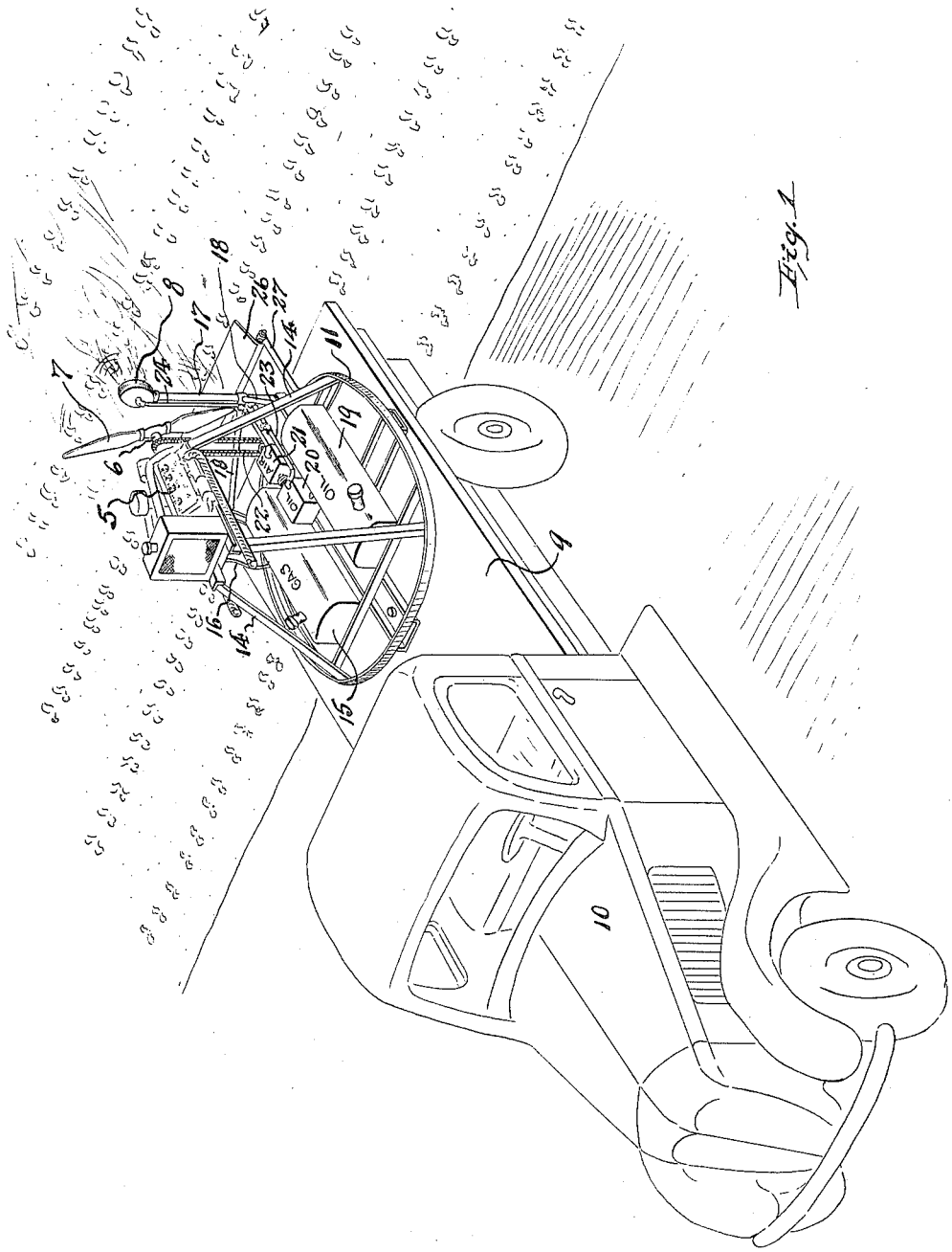
Figure 2:
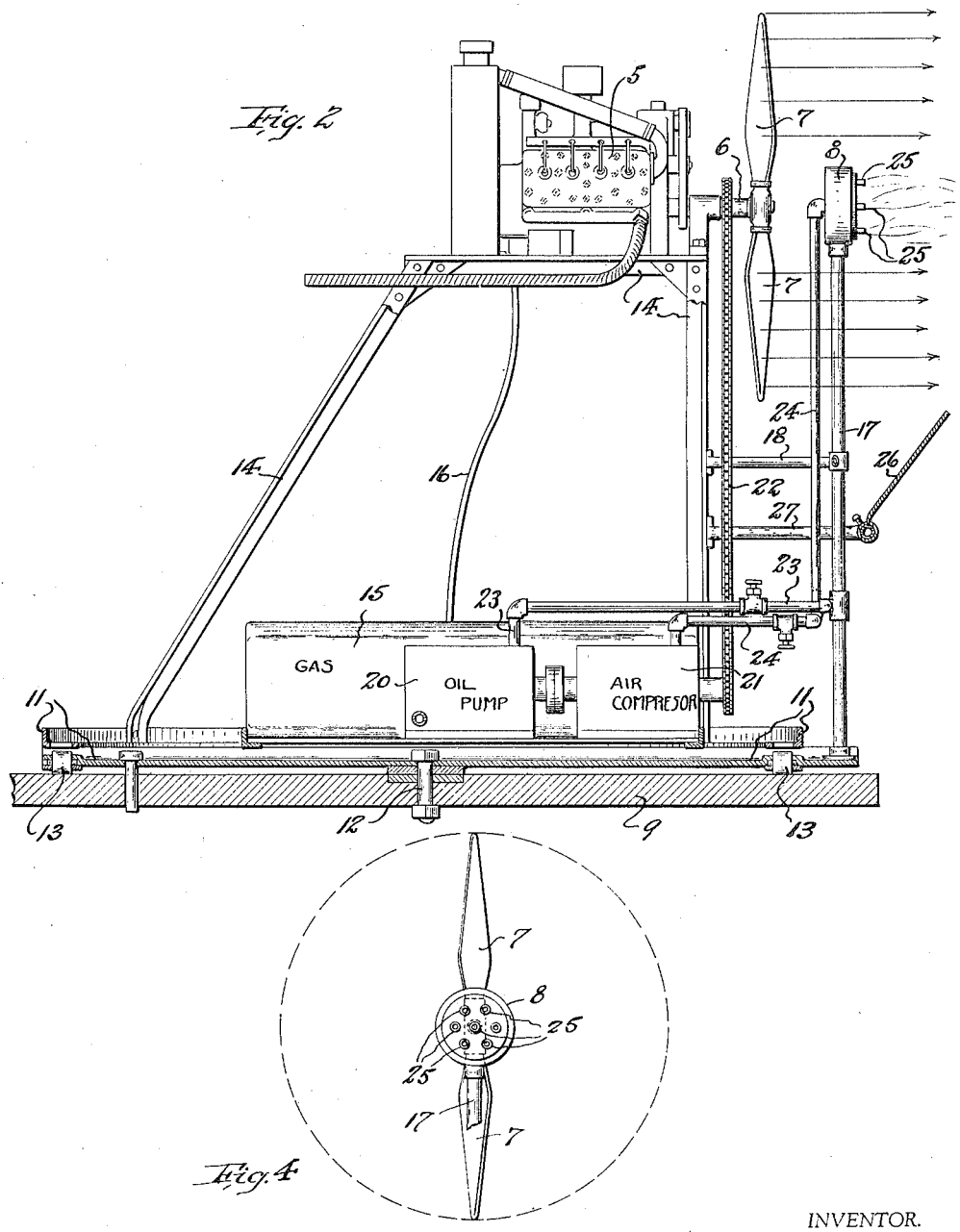
Figure 3:
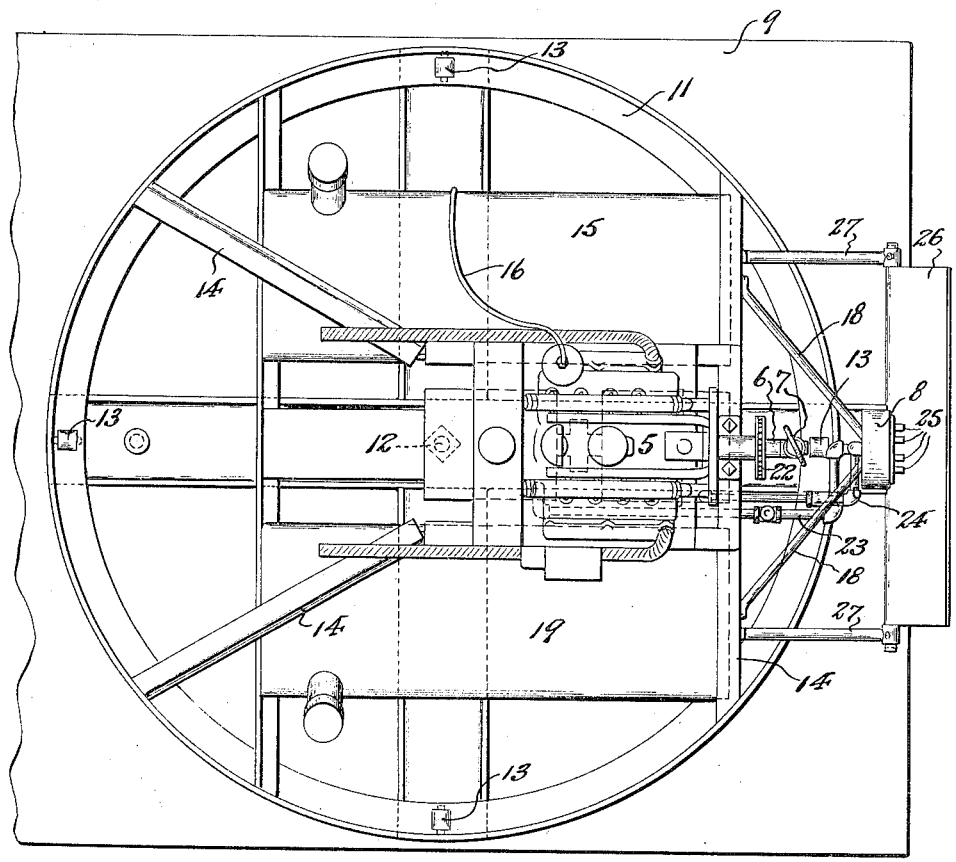

An illustrative embodiment of this invention is shown in the accompanying drawings, in which:

Fig. 1 is a perspective view of a preferred arrangement and construction of the invention in operation; Fig. 2 is a side elevation of the air moving and heating means as supported by a preferred form of carrying frame therefor, and Fig. 3 is a top plan view of the same; and Fig. 4 is a fragmentary face view of the air impeller means showing the relation of the flame thrower or emission means thereto.

Similar characters of reference are employed in the above-described views, to indicate corresponding parts.

Referring to the drawings, the reference character 5 indicates a source of power, preferably comprising an internal combustion engine, to the power shaft 6 of which is affixed an air impeller in the form of a rotary fan, such e. g. as a propeller 7 of the aeroplane type. Mounted adjacent to and in front of said air propeller 7, preferably in axial alignment therewith, so as to be disposed centrally within the air stream induced by the propeller movement, and thus within the zone of the more slowly moving portions of said stream, is a flame thrower or emission means in the form of an oil burner 8.

In preferred arrangement the air propeller 7 and the engine 5 for actuating the same together with the flame emitting oil burner 8 are, together, preferably so mounted as to be capable of quick and easy transportation from place to place. For example, the apparatus including these elements is suitably mounted upon the body platform 9 of a suitable vehicle, preferably an automobile truck 10, whereby the apparatus may be quickly carried from point to point in the area to be served thereby. It is also desirable that the mounting or supporting frame structure for the apparatus be turnably arranged relative to the vehicle body platform 9, as upon a turn-table 11 with which the latter is provided, whereby the induced warm air stream may be pointed in various selective directions at will, so as to conveniently and quickly distribute the warm air over all adjacent portions of the area to be treated. To the latter end, the turn-table 11 is centrally pivoted by a king bolt 12 or the like upon the vehicle body platform 9, and is provided adjacent to its periphery with suitable rollers, casters or equivalent devices 13 to facilitate the turning thereof. Secured to and extending upwardly from said turn-table 11 is a pedestal frame 14, upon the upper end of which is secured, in suitably supported relation thereto, the internal combustion engine 5 aforesaid. A gasoline tank 15, suitably connected with the engine carbureter through pipe 16 so as to supply operating fuel to said engine 5, is preferably mounted upon turn-table 11. The oil burner 8 is mounted on a supporting column or standard 17 which is footed upon and secured to said turn-table 11; said column or standard 17 being braced by struts 18 extending between said pedestal frame 14 and the same. A fuel oil tank 19 is also mounted upon said turn-table 11, together with an oil pump 20 and an air compressor 21, these latter mechanisms being adapted to be driven by suitable power transmission means 22 from the engine 5. The oil pump 20 is supplied from the tank 19 and delivers oil to burner 8 through oil delivery pipe 23, while air is delivered from compressor 21 through air delivery pipe 24 to burner 8, thus providing a combustible fuel, which, being ignited at the burner jets 25 of the burner 8, produces a flame which is projected forwardly from the burner at the center of the air stream generated by the air propeller 7, when the latter is driven by the engine 5.

In the use of the apparatus, when the air propeller is rapidly rotated, the thrust of the propeller is strongest at points intermediate the tips and butts of its blades, and consequently the air stream, which is forwardly projected by the propeller, comprises an annular band of comparatively rapid outwardly moving air masses with relatively slow moving masses at the axial center of the propeller where the burner 8 is located. Owing to this, the flame projected from the burner 8 extends for some distance through the center of the air stream and quickly gives up its heat to the rapidly moving masses thereof, whereby the temperature of the air is raised, and whereby the resultant warm air in large volume, is quickly dispersed outwardly and spread over the adjacent areas of growing plants to be protected. The warm air thus dispersed prevents the precipitation of dew upon the growing plants, which, in conjunction with the rise in temperature and agitation of the air in contact with the plants, gives adequate assurance against the formation of frost on said plants, thus preventing damage thereto which otherwise might result in great destruction, with consequent heavy financial loss to the grower. Another advantage of the arrangement and mode of operation above described lies in the fact that the location of the projected flame from the burner 8 is within the central and more slowly moving mass of the air stream, whereby the projected flame is surrounded by the fast moving outer masses of air, thereby utilizing the latter as a means for preventing too great a heat, radiant from the flame, from extending directly downward upon such plants as lie in the immediate vicinity of the place where the apparatus is, for the time being, stationed, and so that risk of scorching or similar injury to such located plants is avoided. If desired, a further means to deflect the radiant heat of the flame and shield nearby plants therefrom may be provided in the form of shield-plate 26, supported by arms 27 extending from pedestal frame 14, to extend transversely, at any desired angle, beneath the location of burner 8.

The preferred mobile arrangement of the apparatus, as carried on the auto-truck or other suitable vehicle 10, and as mounted on the turn-table support 11 with which the body platform 9 of said vehicle is provided, permits the apparatus to be quickly conveyed from place to place around the crop area desired to be protected, and when temporarily stationed at each desired point, further permits the apparatus to be turned to cause the impelled stream of warm air to be projected in various directions over the plants growing in a considerable area capable of being reached by the thus projected warm air streams from each station. By such mobile arrangement, the apparatus may be quickly moved about and a very considerable area of growing crops may be kept under protection of the delivered warm air, even by means of a single apparatus.

The apparatus may be effectively designed to quickly raise the temperature of very considerable volumes of air and then efficiently disperse the same over a very considerable area of growing plants. The air, generally, need be raised in temperature only a few degrees, i. e. it is not necessary or desirable for it to have a high temperature, with consequent tendency to rise, but rather the air should be and is sufficiently warmed and then efficiently far-flung in overhanging relation to the planted area, so as to both by its warmth and its movement thereby prevent the damaging formation of frost.

From the above it will be obvious that my invention provides a comparatively simple and yet highly efficient apparatus for the described purposes. I am aware that many widely different embodiments of this invention could be made without departing from the scope thereof as defined in the here-following claims. It is. therefore intended that all matter contained in the above description or shown in the accompanying drawings shall be interpreted as illustrative and not in a limiting sense.

I claim:—

1. In apparatus for dispersing warm air for the purposes described, a power driven means for moving large volumes of air in an outflowing current in combination with means for producing a heating flame adjacent to the point of genesis of the induced air current, whereby the heat of said flame is quickly transferred to the moving air masses.

2. In apparatus for dispersing warm air for the purposes described, a power driven propeller moving large volumes of air in an outflowing current in combination with means adjacent to the output side of said propeller for injecting a heating flame into the air current moving from said propeller.

3. In apparatus for dispersing warm air for the purposes described, a power driven propeller for moving large volumes of air in an outflowing current, a flame throwing burner adjacent to the output side of said propeller for injecting a heating flame into the outflowing air current, and means for movably mounting said propeller and burner whereby the directional movement of the outflowing warm air may be changed at will.

4. In combination with a mobile vehicle, an apparatus for dispersing warm air for the purposes described comprising, a power driven means for moving large volumes of air in an outflowing stream and means for producing a heating flame adjacent to the point of genesis of the induced air stream for raising the temperature thereof.

5. In combination with a mobile vehicle, an apparatus for dispersing warm air for the purposes described comprising, a power driven propeller for moving large volumes of air in an outflowing stream, a flame throwing burner adjacent to the output side of said propeller for injecting a heating flame into the outflowing air stream for raising the temperature thereof, and means for movably mounting said propeller and burner on said vehicle whereby the directional movement of the outflowing warm air stream may be changed at will.

6. In apparatus for dispersing warm air for the purposes described, a power driven propeller for projecting an air stream and a flame throwing burner axially aligned with said propeller adjacent to the output side thereof, whereby the flame from the burner is delivered axially into the outflowing air stream and surrounded by the more rapidly moving annular outer portions of the latter.

7. In combination with a mobile vehicle having an open platform, a turn-table mounted on said platform, and apparatus mounted on said turn-table to disperse warm air for the purposes described, said apparatus comprising a power driven means for moving large volumes of air in an outflowing stream and means for producing a heating flame adjacent to the point of genesis of the induced air stream for raising the temperature thereof.

8. In combination with a mobile vehicle having an open platform, a turn-table mounted on said platform, an apparatus mounted on said turn-table to disperse warm air for the purposes described, said apparatus comprising a power driven propeller for moving large volumes of air in an outflowing stream, and a flame throwing burner adjacent to the output side of said propeller for injecting a heating flame into the outflowing air stream.

9. In combination with a mobile vehicle having an open platform, a turn-table mounted on said platform, an apparatus mounted on said turn-table to disperse warm air for the purposes described, said apparatus comprising a power driven propeller for moving large volumes of air in an outflowing stream, and a flame throwing burner axially aligned with said propeller adjacent to the output side thereof, whereby the flame from said burner is delivered axially into the outflowing air stream and surrounded by the more rapidly moving annular outer portions of the latter.

10. In combination with a mobile vehicle having an open platform, a turn-table mounted on said platform, a supporting frame-work on said turn-table, an internal combustion engine mounted on said frame-work, a propeller driven by said engine for moving large volumes of air in an outflowing stream, a flame throwing burner carried by said turn-table and positioned in front of said propeller, and means operated from said engine for supplying a combustible fuel to said burner.

JAMES M. SEYMOUR.